US007233380B2

(12) United States Patent
Chae (10) Patent No.: US 7,233,380 B2
(45) Date of Patent: Jun. 19, 2007

(54) ARRAY SUBSTRATE FOR USE IN IN-PLANE SWITCHING MODE LIQUID CRYSTAL DISPLAY DEVICE AND METHOD OF FABRICATING THE SAME

(75) Inventor: Gee Sung Chae, Incheon (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 11/003,397

(22) Filed: Dec. 6, 2004

(65) Prior Publication Data

US 2005/0094080 A1 May 5, 2005

Related U.S. Application Data

(62) Division of application No. 10/325,873, filed on Dec. 23, 2002, now Pat. No. 7,123,331.

(30) Foreign Application Priority Data

Dec. 28, 2001 (KR) ...................... 10-2001-0087401

(51) Int. Cl.
*G02F 1/1343* (2006.01)
(52) U.S. Cl. ..................................... 349/141
(58) Field of Classification Search ............ None
See application file for complete search history.

(56) References Cited

U.S. PATENT DOCUMENTS

| 5,977,562 | A  | * | 11/1999 | Hirakata et al. ............... 257/72 |
| 6,281,958 | B1 | * | 8/2001  | Nakajima .................... 349/141 |
| 6,396,556 | B1 | * | 5/2002  | Watanabe .................... 349/141 |
| 6,525,798 | B1 | * | 2/2003  | Yamakita et al. ........... 349/141 |

\* cited by examiner

*Primary Examiner*—David Nelms
*Assistant Examiner*—Michael H. Caley
(74) *Attorney, Agent, or Firm*—McKenna Long & Aldridge LLP (57) ABSTRACT

The present invention is related to an IPS-LCD device and a method of fabricating an array substrate for use in the IPS-LCD device, which increase a high aperture ratio and provide a large and enough storage capacitance. A common line formed of an opaque metal is designed to have a small width for the increased aperture ratio. A portion of a pixel electrode overlaps one of common electrodes, thereby forming a supplementary storage capacitor. As a result, with a main storage capacitor comprised of a portion of pixel electrode and a portion of common line, the array substrate of the present invention can have two storage capacitors. A sufficient and satisfactory capacitance can be obtained and the aperture ratio is raised.

15 Claims, 4 Drawing Sheets

ARRAY SUBSTRATE FOR USE IN IN-PLANE SWITCHING MODE LIQUID CRYSTAL DISPLAY DEVICE AND METHOD OF FABRICATING THE SAME

This application is a divisional of application Ser. No. 10/325,873, filed Dec. 23, 2002, which claims priority to Korean Patent Application No. 2001-87401, filed Dec. 28, 2001, each of which are incorporated by reference for all purposes as if fully set forth herein.

This application claims the benefit of Korean Patent Application No. 2001-0087401, filed on Dec. 28, 2001, which is hereby incorporated by reference for all purposes as if fully set forth herein.

BACKGROUND OF THE INVENTION

1. Field of the Invention

The present invention relates to a liquid crystal display (LCD) device, and more particularly, to an array substrate for use in an in-plane switching mode liquid crystal display device (IPS-LCD).

2. Description of the Related Art

A liquid crystal display device uses the optical anisotropy and polarization properties of liquid crystal molecules to produce an image. Liquid crystal molecules have a definite alignment direction as a result of their long, thin shapes. That alignment direction can be controlled by an applied electric field. In other words, as the direction of an applied electric field changes, so does the alignment of the liquid crystal molecules. Due to the optical anisotropy, the refraction of incident light depends on the alignment direction of the liquid crystal molecules. Thus, by properly controlling an applied electric field, a desired light image can be produced.

Of the different types of known LCDs, active matrix LCDs (AM-LCDs), which have thin film transistors and pixel electrodes arranged in a matrix form, are the subject of significant research and development because of their high resolution and superiority in displaying moving images.

LCD devices have wide application in office automation (OA) equipment and video units because they are light and thin and have low power consumption characteristics. The typical liquid crystal display (LCD) panel has an upper substrate, a lower substrate and a liquid crystal layer interposed therebetween. The upper substrate, commonly referred to as a color filter substrate, usually includes a common electrode and color filters. The lower substrate, commonly referred to as an array substrate, includes switching elements, such as thin film transistors (TFTs) and pixel electrodes.

As previously described, LCD device operation is based on the principle that the alignment direction of the liquid crystal molecules is dependent upon an electric field applied between the common electrode and the pixel electrode. Thus, the alignment direction of the liquid crystal molecules is controlled by the application of an electric field to the liquid crystal layer. When the alignment direction of the liquid crystal molecules is properly adjusted, incident light is refracted along the alignment direction to display image data. The liquid crystal molecules function as an optical modulation element having variable optical characteristics that depend upon polarity of the applied voltage.

In a conventional LCD device, since the pixel and common electrodes are positioned on the lower and upper substrates, respectively, the electric field induced between them is perpendicular to the lower and upper substrates.

However, the conventional LCD devices having the longitudinal electric field have a drawback in that they have a very narrow viewing angle. In order to solve the problem of narrow viewing angle, in-plane switching liquid crystal display (IPS-LCD) devices have been proposed. The IPS-LCD devices typically include a lower substrate where a pixel electrode and a common electrode are disposed, an upper substrate having no electrode, and a liquid crystal interposed between the upper and lower substrates. A detailed explanation about the lower substrate (i.e., array substrate) of the IPS-LCD device will be provided referring to figures.

Figure 1:
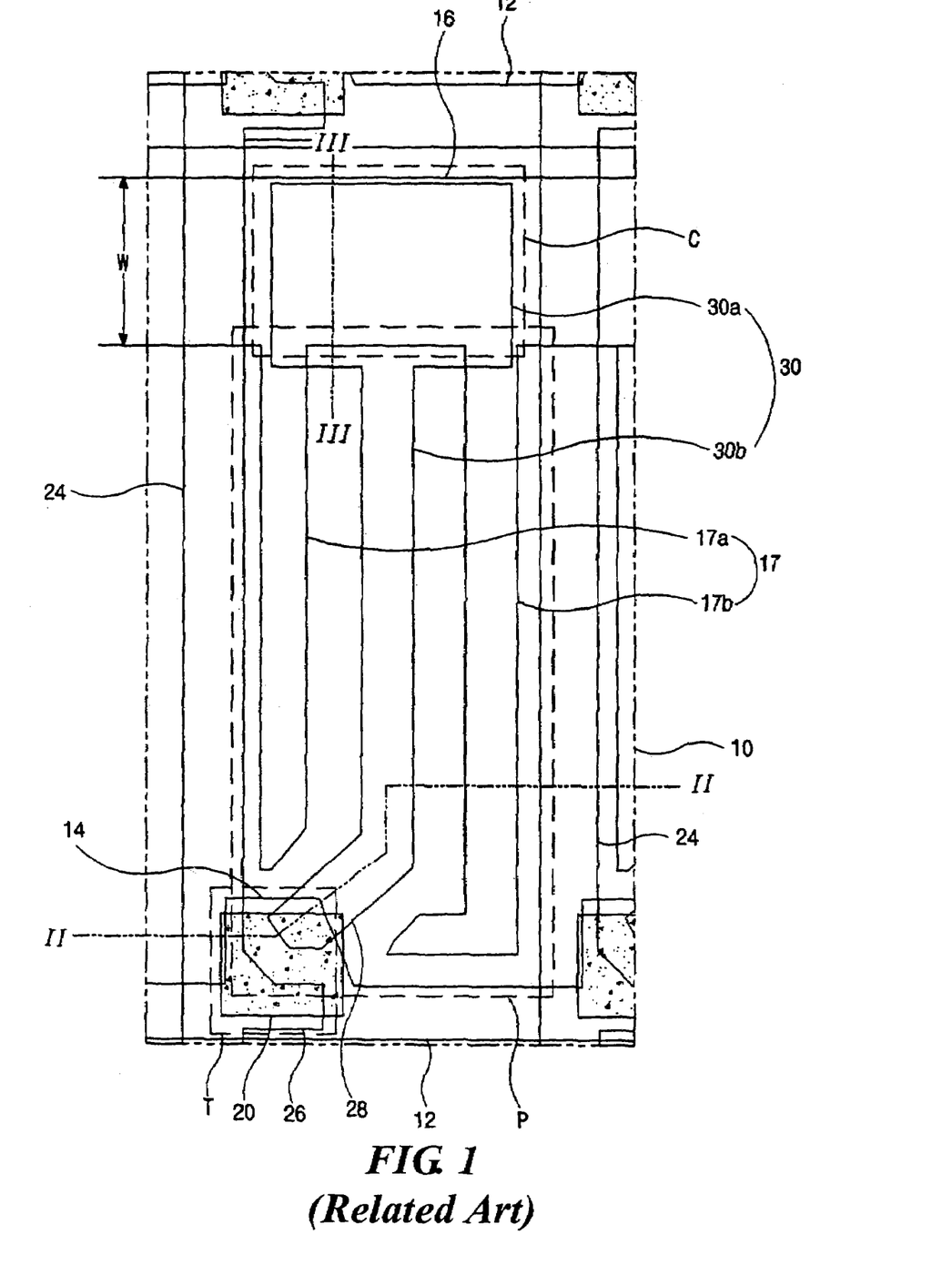
FIG. 1 is a plan view illustrating one pixel of an array substrate of an in-plane switching mode liquid crystal display (IPS-LCD) device according to a related art.

FIG. 1 is a plan view illustrating one pixel of an array substrate of an in-plane switching mode liquid crystal display (IPS-LCD) device according to a related art. As shown, gate lines 12 are transversely disposed on a substrate (see reference element 10 of FIG. 2A). A common line 16 is spaced apart from the gate lines 12, and disposed adjacent to and parallel with the gate lines 12. Data lines 24 that are spaced apart from each other are disposed across and substantially perpendicular to the gate and common lines 12 and 16. A pair of data lines 24 and a pair of gate and common lines 12 and 16 define a pixel area P.

A switching device, e.g., a thin film transistor T, is positioned near the crossing of the gate and data lines 12 and 24. As shown in FIG. 1, the thin film transistor T includes a gate electrode 14, an active layer 20, a source electrode 26 and a drain electrode 28. The gate and source electrodes 14 and 26 are positioned and electrically connected with the gate and data lines 12 and 24, respectively. Namely, the gate electrode 14 extends from the gate line 12, while the source electrode 26 extends from the data line 24. The drain electrode 28 is spaced apart from the source electrode 26 and overlaps a portion of the active layer 20. The active layer 20 is located right above the gate electrode 14 and under the source and drain electrodes 26 and 28. Thus, the source electrode 26 and the drain electrode 28 overlap portions of the active layer 20, respectively.

In the pixel area P, a pixel electrode 30 connected to the drain electrode 28 is disposed. The pixel electrode 30 includes a horizontal portion 30a above the common line 16 and a vertical portion 30b parallel with the data lines 24. The horizontal and vertical portions 30a and 30b and the drain electrode 28 are formed as one united body. A common electrode 17 including first and second common electrodes 17a and 17b is also disposed in the pixel area P. The first and second common electrodes 17a and 17b extend from the common line 16 and are formed as one united body with the common line 16. The first and second common electrodes 17a and 17b are parallel with and adjacent to the data lines 24, respectively. Between the first and second common electrodes 17a and 17b, the vertical portion 30b of the pixel electrode 30 is positioned.

There is a storage capacitor C that is parallel-connected to the pixel at the top of the pixel area P. The storage capacitor C is formed of a portion of the common line 16, a horizontal portion 30a of the pixel electrode 30, and a dielectric layer (not shown). Namely, the portion of the common line 16 acts as a first electrode and the horizontal portion 30a of the pixel electrode 30 acts as a second electrode in the storage capacitor C. The common line 16 in the related art shown in FIG. 1 has a width W. When designing the common line 16 to have the width W, the width W of the related art should be as large as necessary so that the signal can easily flow through the common line 16 and the storage capacitor C can have an enough capacitance.

Figure 2A:
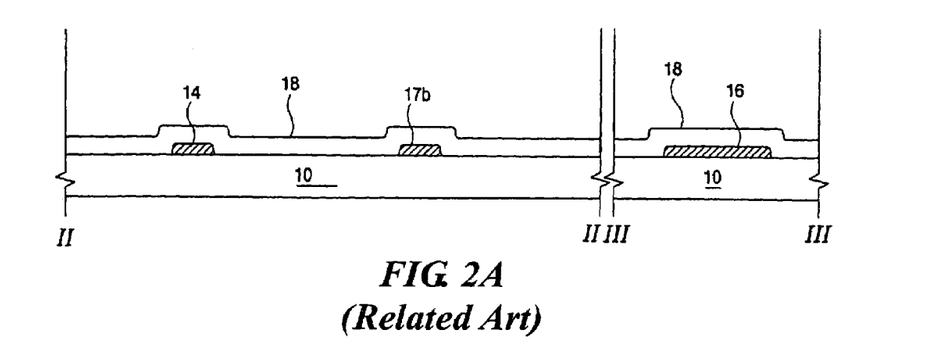
FIGS. 2A to 2C are cross sectional views taken alone lines II—II and III—III of FIG. 1 and illustrate fabricating processes for the array substrate.
Figure 2B:
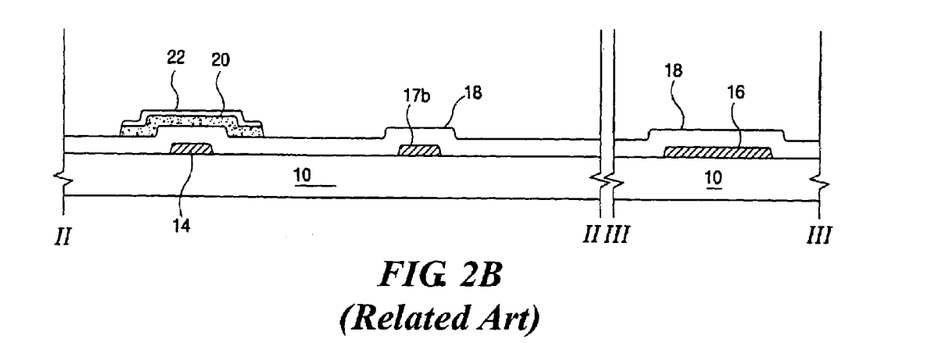
Figure 2C:
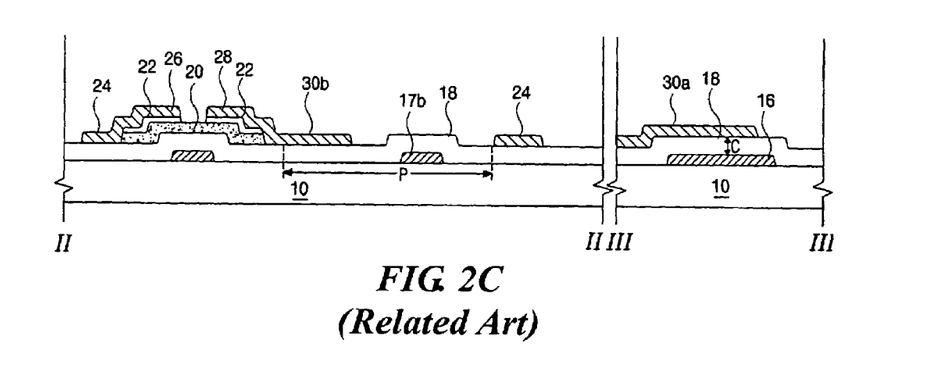

FIGS. 2A to 2C are cross sectional views taken along lines II—II and III—III of FIG. 1 and illustrate fabricating processes for the array substrate.

Referring to FIG. 2A, a first metal layer is formed on a substrate 10 and then patterned to form the gate line 12 (see FIG. 1), the gate electrode 14, the common line 16, and the first and second common electrodes 17a and 17b. Aluminum (Al), aluminum alloy (e.g., aluminum neodymium (AlNd)), chromium (Cr), molybdenum (Mo) or tungsten (W) is used as a material for the first metal layer. The gate electrode 14 protrudes from the gate line 12 (see FIG. 1). The common line 16 is adjacent to and parallel with the gate line. Further, the common line 16 is spaced apart from the gate line by a predetermined distance. As mentioned before, the first and second common electrodes 17a and 17b extend from the common line 16 and are disposed parallel with and adjacent to the data lines that are formed in a later step. Thereafter, a gate insulation layer 18 is formed on entire surface of the substrate 10 to cover the patterned first metal layer. Thus, for example, as shown in FIG. 2A, the gate electrode 14, the second common electrode 17b and the common line 16 are covered by the gate insulation layer 18. The gate insulation layer 18 is an inorganic material, such as silicon nitride ($SiN_x$).

In FIG. 2B, an amorphous silicon layer (a-Si: H) and an impurity-included amorphous silicon layer ($n^+$ a-Si: H) are sequentially formed on the gate insulation layer 18 and then patterned to form the active layer 20 and an ohmic contact layer 22. Particularly, the active layer 20 and the ohmic contact layer 22 are formed right above the gate electrode 14. Since the amorphous silicon layer (a-Si: H) and the impurity-included amorphous silicon layer ($n^+$ a-Si: H) are simultaneously patterned, the active layer 20 is interposed between the ohmic contact layer 22 and the gate insulation layer 18.

Now in FIG. 2C, a second metal layer is formed on entire surface of the gate insulation layer 18 and then patterned to form the data lines 24, the source electrode 26, the drain electrode 28 and the pixel electrode 30 (including the horizontal portion 30a and the vertical portion 30b). As with the first metal layer, the second metal layer is one of chromium (Cr), aluminum (Al), aluminum alloy (e.g., AlNd), molybdenum (Mo), and the like. As shown and mentioned with reference FIG. 1, the data lines 24 cross both the gate line 12 and the common line 16, and define the pixel area P with both the gate line 12 and the common line 16. The source electrode 26 extends from the data line 24 and overlaps a portion of the ohmic contact layer 20. The horizontal portion 30a of the pixel electrode 30 is formed above the common line 16 to overlap a portion of the common line 16. The vertical portion 30b of the pixel electrode 30 extends from the horizontal portion 30a to the pixel area P and is disposed between the first and second common electrodes 17a and 17b parallel with the data lines. At the end of the vertical portion 30b of the pixel electrode 30, the drain electrode 28 is formed to overlap a portion of the ohmic contact layer 22. Since the source and drain electrodes 26 and 28 are spaced apart from each other, a portion of the ohmic contact layer 22 is removed using the source and drain electrodes 26 and 28 as a mask. Thus, a channel region is formed in the active layer 20 between the source and drain electrodes 26 and 28. The portion of the common line 16 and the horizontal portion 30a form the storage capacitor C. As mentioned before, the portion of the common line 16 acts as a first electrode of the storage capacitor, the horizontal portion 30a of the pixel electrode 30 acts as a second electrode of the storage capacitor, and the gate insulation layer 18 between the common line 16 and the horizontal portion 30a acts as a dielectric layer.

According to aforementioned structure of the array substrate shown in FIGS. 1 and 2A–2C, the array substrate for the IPS-LCD device has only one storage capacitor in the pixel. Thus, the common line acting as a first storage electrode needs to be designed to have large width for sufficient and satisfactory capacitance. In this case, since the common line is formed of an opaque material, the aperture ratio of the pixel becomes decreased.

SUMMARY OF THE INVENTION

Accordingly, the present invention is directed to an IPS-LCD device that substantially obviates one or more of the problems due to limitations and disadvantages of the related art.

An advantage of the present invention is to provide a method of fabricating an array substrate for use in the IPS-LCD device (as well as the array substrate itself), which have a common line having a small width to increase the aperture ratio.

Another advantage of the present invention is to provide the method of fabricating the array substrate (as well as the array substrate itself) for use in the IPS-LCD device, which is designed to have an additional storage capacitor for the increase of capacitance.

Additional features and advantages of the invention will be set forth in the description, which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an embodiment of the present invention provides an array substrate for use in an IPS-LCD device, including: a gate line on a substrate and disposed in a first direction; a common line on the substrate; first and second common electrodes substantially perpendicularly extending from the common line; a gate insulation layer formed on the substrate to cover the gate line, the common line and the first and second common electrodes; a data line formed on the gate insulation layer and disposed in a second direction substantially perpendicularly crossing both the gate line and the common line to define a pixel area; a pixel electrode on the gate insulation layer, the pixel electrode having first, second and third portions, wherein the first portion is disposed between the first and second common electrodes, the second portion is disposed overlapping the second common electrode, and the third portion is disposed above the common line; and a thin film transistor at a crossing of the gate and data lines, the thin film transistor having a gate electrode, an active layer, a source electrode and a drain electrode. According to the array substrate of the present invention, a width of the second common electrode overlapped by the second portion of the pixel electrode is larger than that of the second portion of the pixel electrode by about 6 micrometers. A distance between the first and second portions of the pixel electrode is larger by about 3 micrometers than a distance between the first portion of the pixel electrode and the second common electrode. An end of the first portion is connected to the drain electrode of the thin film transistor. The thin film transistor further includes an ohmic contact layer on the active layer. The source electrode extends from the data line, the gate electrode extends from the gate line, the drain electrode extends from the first portion of the pixel electrode, the active layer is disposed above the gate electrode, and the ohmic contact layer is interposed between the active layer and the source and drain electrodes. The gate electrode, the gate line, the common line, the first and second common electrode, the source and drain electrodes, the data line, and the pixel electrode include one of aluminum (Al), aluminum alloy (Al alloy), chromium (Cr), molybdenum (Mo), and tungsten (W). The common line and the first and second common electrodes are formed as one united body. The pixel electrode and the drain electrode are formed as one united body. The third portion of the pixel electrode and a portion of the common line form a first storage capacitor with the gate insulation layer interposed therebetween. The second portion of the pixel electrode and the second common electrode form a second storage capacitor with the gate insulation layer interposed therebetween.

In another aspect of the present invention is to provide a method of fabricating an array substrate for use in an IPS-LCD device. According to the present invention, the method include: forming a gate line, a gate electrode, a common line and first and second common electrode on a substrate using a first metal layer, wherein the gate and common lines are disposed in a first direction; forming a gate insulation layer on entire surface of the substrate to cover the first metal layer; forming an active layer on the gate insulation layer and an ohmic contact layer on the active layer using an amorphous silicon and impurity-doped amorphous silicon; forming a data line, a source electrode, a drain electrode and a pixel electrode using a second metal layer, wherein the data line is disposed on the gate insulation layer in a second direction substantially perpendicularly crossing both the gate line and the common line to define a pixel area, wherein the source and drain electrode are disposed on the ohmic contact layer and spaced apart from each other, and wherein the pixel electrode is disposed on the gate insulation layer and includes a first portion that is disposed between the first and second common electrodes, a second portion that is disposed overlapping the second common electrode, and a third portion that is disposed above the common line; and forming a thin film transistor at a crossing of the gate and data lines, the thin film transistor having the gate electrode, the active layer, the ohmic contact layer, the source electrode and the drain electrode. A width of the second common electrode overlapped by the second portion of the pixel electrode is larger than that of the second portion of the pixel electrode by about 6 micrometers. A distance between the first and second portions of the pixel electrode is larger than a distance between the first portion of the pixel electrode and the second common electrode by about 3 micrometers. An end of the first portion is connected to the drain electrode of the thin film transistor. The source electrode extends from the data line, the gate electrode extends from the gate line, the drain electrode extends from the first portion of the pixel electrode, the active layer is disposed right above the gate electrode, and the ohmic contact layer interposed between the active layer and the source and drain electrodes. The first and second metal layers are formed of one of aluminum (Al), aluminum alloy (Al alloy), chromium (Cr), molybdenum (Mo), and tungsten (W). The common line and the first and second common electrodes are formed as one united body. The pixel electrode and the drain electrode are formed as one united body. The third portion of the pixel electrode and a portion of the common line form a first storage capacitor with the gate insulation layer interposed therebetween. The second portion of the pixel electrode and the second common electrode form a second storage capacitor with the gate insulation layer interposed therebetween.

It is to be understood that both the foregoing general description and the following detailed description are exemplary and explanatory and are intended to provide further explanation of the invention as claimed.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF THE ILLUSTRATED EMBODIMENT

Reference will now be made in detail to an illustrated embodiment of the present invention, an example of which is shown in the accompanying drawings. Wherever possible, similar reference numbers will be used throughout the drawings to refer to the same or similar parts.

Figure 3:
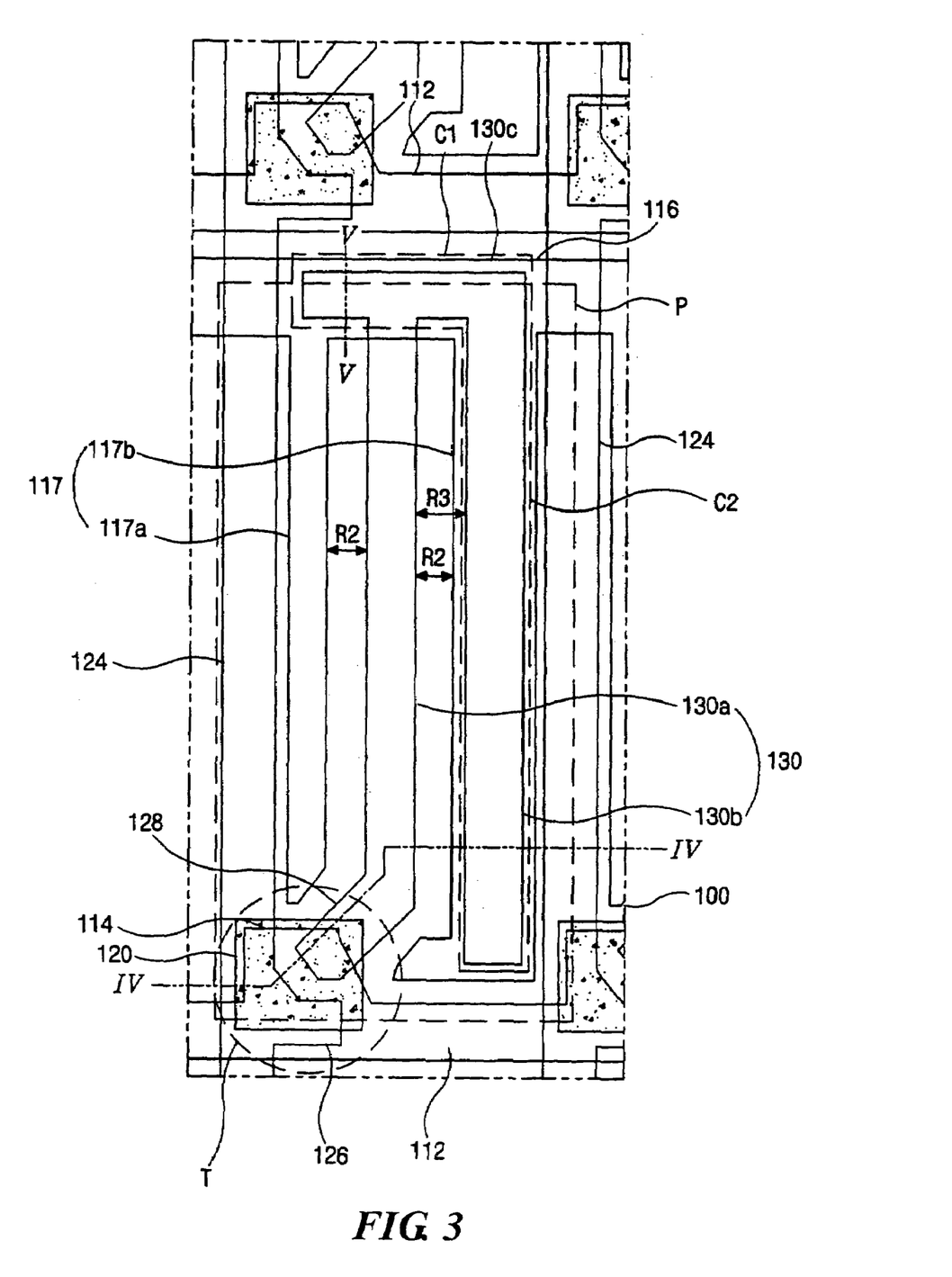
FIG. 3 is a plan view illustrating one pixel of an array substrate of an in-plane switching mode liquid crystal display (IPS-LCD) device according to an embodiment.

FIG. 3 is a plan view illustrating one pixel of an array substrate of an in-plane switching mode liquid crystal display (IPS-LCD) device according to an embodiment of the present invention. As shown, gate lines 112 are transversely disposed on a substrate (see reference element 100 of FIG. 4A). A common line 116 is spaced apart from and disposed parallel with and adjacent to the gate lines 112. Data lines 124 that are spaced apart from each other are disposed across and substantially perpendicular to the gate and the common lines 112 and 116. A pair of gate and common lines 112 and 116 and a pair of data lines 124 define a pixel area P.

A switching device, e.g., a thin film transistor (TFT), which is indicated by a portion T, is positioned near the crossing of the gate and data lines 112 and 124. As shown in FIG. 3, the thin film transistor T includes a gate electrode 114, an active layer 120, a source electrode 126 and a drain electrode 128. The gate and source electrodes 114 and 126 are positioned and electrically connected with the gate and data lines 112 and 124, respectively. The drain electrode 128 is spaced apart from the source electrode 126 and overlaps one portion of the gate electrode 114. The source electrode 126 also overlaps the other portion of the gate electrode 114. An active layer 120 is located right above the gate electrode 114 and under the source and drain electrodes 126 and 128. The active layer 120 may be located right above the gate electrode 114.

In the pixel area P, a common electrode 117 including first and second common electrodes 117a and 117b is disposed substantially parallel with the data lines 124. The first and second common electrodes 117a and 117b are adjacent to the data lines 124, respectively. The first and second common electrodes 117a and 117b extend from the common line 116 and are formed as one united body with the common line 116. In the present invention, the second common electrode 117b has a larger width than the first common electrode 117a.

Still referring to FIG. 3, a pixel electrode 130 including first, second and third portions 130a, 130b and 130c is disposed in the pixel area P. The first and second portions 130a and 130b are substantially parallel with the data lines 124. The first portion 130a of the pixel electrode 130 is disposed between the first and second common electrodes 117a and 117b, while the second portion 130b of the pixel electrode 130 is disposed above the second common electrode 117b to overlap the second common electrode 117b. The second portion 130b of the pixel electrode 130 may be disposed right above the second common electrode 117b. In the present invention, a width of the second portion 130b of the pixel electrode 130 is smaller than that of the second common electrode 117b. The first portion 130a of the pixel electrode 130 is connected to the drain electrode 128 of the thin film transistor T. The third portion 130c of the pixel electrode 130 is disposed above the common line 116 and connects the first portion 130a to the second portion 130b so that the first and second portions 130a and 130b are in a shape of extending from the third portion 130c.

In the present invention shown in FIG. 3, the width of the second common electrode 117b is larger than that of the second portion 130b of the pixel electrode 130 by about 3 micrometers on both sides. Further, the distances R2 between the first portion 130a of the pixel electrode 130 and the first and second common electrodes 117a and 117b are the same. Moreover, the second portion 130b does not act as a pixel electrode actually, but constitutes a supplementary storage capacitor C2 with the second common electrode 117b. Namely, the second common electrode 117b acts as a first capacitor electrode, and the second portion 130b of the pixel electrode 130 acts as a second capacitor electrode in the supplementary storage capacitor C2. In the structure shown in FIG. 3, a distance R3 between the first and second portions 130a and 130b of the pixel electrode 130 is larger than the distance R2 by about 3 micrometers because the second portion 130b of the pixel electrode 130 is smaller than the second common electrode 117b by 6 micrometers (3 micrometers on both sides). Although the first portion 130a and the second portion 130b of the pixel electrode 130 are formed in the same plane using the same material, the second portion 130b does not electrically interfere with the first portion 130a because the distance R3 between the first and second portions 130a and 130b is larger by about 3 micrometers than the distance R2 between the first portion 130a and the second common electrode 117b, where the electric field is generated. Namely, the first and second portions 130a and 130b do not affect to each other. Accordingly, the electric field is only generated in intervals between the first portion 130a of the pixel electrode 130 and the first common electrode 117a and between the first portion 130a of the pixel electrode 130 and the second common electrode 117b.

Furthermore, the third portion 130c of the pixel electrode 130 forms a main storage capacitor C1 with the common line 116 at a top of the pixel area P. The storage capacitor C1 is comprised of a portion of the common line 116, the third portion 130c of the pixel electrode 130, and a dielectric layer (not shown). Thus, the portion of the common line 116 acts as a first electrode and the third portion 130c of the pixel electrode 130 acts as a second electrode in the storage capacitor C1. According to the aforementioned inventive structure of the array substrate shown in FIG. 3, a width of the common line 116 is smaller than the width W of the related art IPS-LCD illustrated in FIG. 1 because the main storage capacitor C1 does not need to have a large capacitance. Since the array substrate of FIG. 3 has the supplementary storage capacitor C2 in the pixel area, the common line 116 does not have to be designed to have a larger width. Namely, there are two storage capacitors C1 and C2 in the array substrate of the present invention. Since the common line 116 of the present invention has a small width rather than that of the related art, the high aperture ratio can be achieved in the present invention.

Figure 4A:
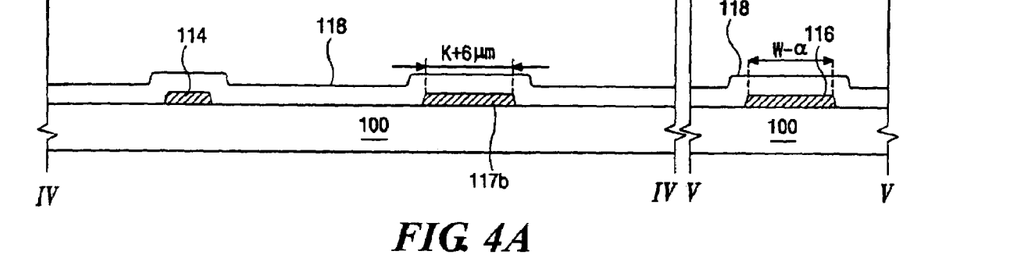
FIGS. 4A to 4C are cross-sectional views taken alone lines IV—IV and V—V of FIG. 3 and illustrate fabricating processes for the array substrate according to the embodiment illustrated in FIG. 3.
Figure 4B:
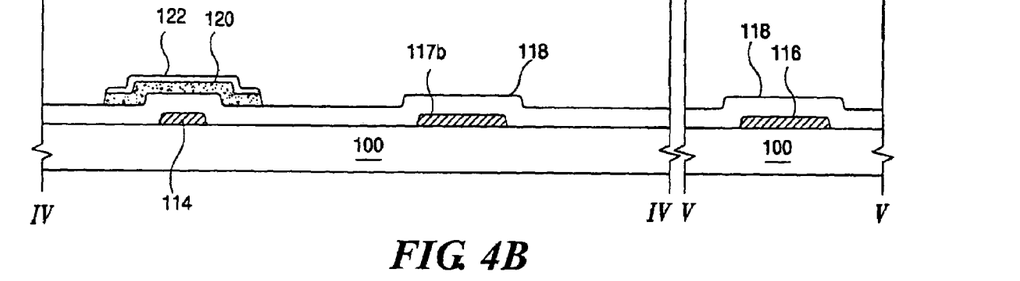
Figure 4C:
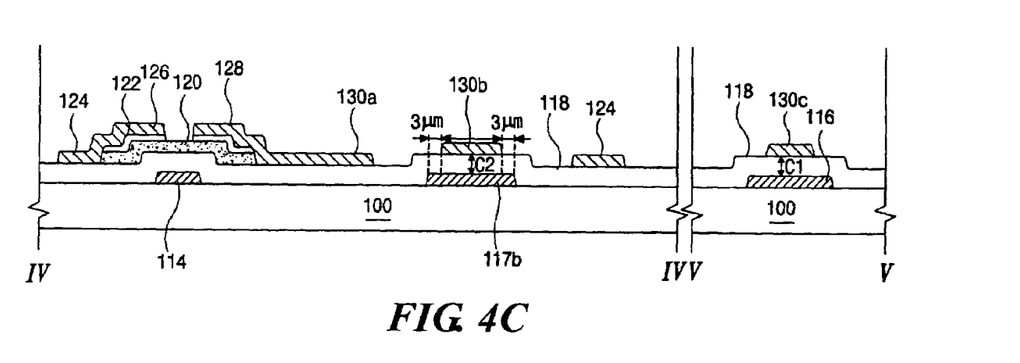

FIGS. 4A to 4C are cross-sectional views taken alone lines IV—IV and V—V of FIG. 3 and illustrate fabricating processes for the array substrate according to an embodiment of the present invention.

Referring to FIG. 4A, a first metal layer is formed on a transparent substrate 100 and then patterned to form the gate line 112 (see FIG. 3), the gate electrode 114, the common line 116, and the first and second common electrodes 117a and 117b. Aluminum (Al), aluminum alloy (e.g., aluminum neodymium (AlNd)), chromium (Cr), molybdenum (Mo), tungsten (W) or the like is used as a material for the first metal layer. The gate electrode 114 protrudes from the gate line 112 (see FIG. 3). The common line 116 is adjacent to and substantially parallel with the gate line. Further, the common line 116 is spaced apart from the gate line by a predetermined distance. At this time of forming the common line 116, the common line 116 is designed to have a width that is smaller than the related art width W (see FIG. 1) by alpha ($\alpha$) (i.e., W-$\alpha$). The first and second common electrodes 117a and 117b extend from the common line 116 and are disposed substantially parallel with and adjacent to the data lines that are formed in a later step. When designing the first and second common electrodes 117a and 117b, the second common electrode 117b is designed to have a width K+6 that is larger than a width K of the first common electrode 117a by about 6 micrometers.

After forming and patterning the first metal layer on the transparent substrate 100, a gate insulation layer 118 is formed on entire surface of the transparent substrate 100 to cover the patterned first metal layer. Thus, for example, as shown in FIG. 4A, the gate electrode 114, the second common electrode 117b having the width K+6 and the common line 116 having the width W-$\alpha$ are covered by the gate insulation layer 118. The gate insulation layer 118 is an inorganic material, such as silicon nitride ($SiN_x$) or silicon oxide ($SiN_x$).

In FIG. 4B, an amorphous silicon layer (a-Si: H) and an impurity-doped amorphous silicon layer ($n^+$ a-Si: H) are sequentially formed on the gate insulation layer 118 and then patterned to form the active layer 120 and an ohmic contact layer 122. Particularly, the active layer 120 and the ohmic contact layer 122 are formed above the gate electrode 114. Since the amorphous silicon layer (a-Si: H) and the impurity-doped amorphous silicon layer ($n^+$ a-Si: H) are simultaneously patterned, the active layer 120 is interposed between the ohmic contact layer 122 and the gate insulation layer 118.

In FIG. 4C, a second metal layer is formed on entire surface of the gate insulation layer 118 and then patterned to form the data lines 124, the source electrode 126, the drain electrode 128 and the pixel electrode 130 (including the first, second and third portions 130a, 130b and 130c). As with the first metal layer, the second metal layer is one of chromium (Cr), aluminum (Al), aluminum alloy (e.g., AlNd), molybdenum (Mo), and the like. As shown and mentioned with reference FIG. 3, the data lines 124 cross both the gate line 112 and the common line 116, and define the pixel area P with both the gate line 112 and the common line 116. The source electrode 126 extends from the data line 124 and overlaps a portion of the ohmic contact layer 120. The third portion 130a of the pixel electrode 130 is formed above the common line 116 to overlap a portion of the common line 116. The third portion 130a of the pixel electrode 130 may be formed right above the common line 116. The third portion 130a of the pixel electrode 130, the common line 116 and the interposed gate insulation layer 118 form the main storage capacitor C1. The first and second portions 130a and 130b of the pixel electrode 130 extend from the third portion 130c of the pixel electrode 130 substantially parallel with the data lines 124, as shown in FIG. 3. At the end of the first portion 130a of the pixel electrode 130, the drain electrode 128 is formed overlapping a portion of the ohmic contact layer 122. The first portion 130b of the pixel electrode 130 is disposed between the first and second common electrodes 117a and 117b substantially parallel with the data lines 124. The second portion 130b of the pixel electrode 130 is disposed above the second common electrode 117b overlapping the second common electrode 117b. The width of the second portion 130b of the pixel electrode 130 is smaller than that of the second common electrode 117b by about 3 micrometers on both sides. The second portion 130b of the pixel electrode 130 and the second common electrode 117b form the supplementary storage capacitor C2 with the gate insulation layer 118 interposed therebetween. The gate insulation layer 118 acts as a dielectric layer in both the main storage capacitor C1 and the supplementary storage capacitor C2. Since the source and drain electrodes 126 and 128 are spaced apart from each other, a portion of the ohmic contact layer 122 is removed using the source and drain electrodes 126 and 128 as a mask. Thus, a channel region is formed in the active layer 120 between the source and drain electrodes 126 and 128.

As described herein before, according to the illustrated embodiment of the present invention, since the common line has a small width compared to the related art, the aperture ratio of the IPS-LCD device increases as much as the reduction in width of the common line. Furthermore, since the array substrate of the illustrated embodiment of the present invention has two storage capacitors, i.e., the main and supplementary storage capacitors, enough and sufficient capacitance can be achieved, thereby allowing the IPS-LCD device to have high resolution and high quality of displayed images.

It will be apparent to those skilled in the art that various modifications and variation can be made in the method of manufacturing a thin film transistor of the present invention without departing from the spirit or scope of the invention. Thus, it is intended that the present invention cover the modifications and variations of this invention provided they come within the scope of the appended claims and their equivalents.

What is claimed is:

1. A method of fabricating an array substrate for use in an IPS-LCD device, comprising:

forming a gate line, a gate electrode, a common line and first and second common electrodes on a substrate using a first metal layer, wherein the gate and common lines are disposed in a first direction;

forming a gate insulation layer on an entire surface of the substrate to cover the first metal layer;

forming an active layer on the gate insulation layer and an ohmic contact layer on the active layer using an amorphous silicon and impurity-doped amorphous silicon;

forming a data line, a source electrode, a drain electrode and a pixel electrode using a second metal layer, wherein the data line is disposed on the gate insulation layer in a second direction substantially perpendicularly crossing both the gate line and the common line to define a pixel area, wherein the source and drain electrodes are disposed on the ohmic contact layer and spaced apart from each other, and wherein the pixel electrode is disposed on the gate insulation layer and includes a first portion that is disposed between the first and second common electrodes, a second portion that is disposed to have a width along the first direction substantially completely overlapped by the second common electrode, and a third portion that is disposed above the common line, wherein the first and second portions of the pixel electrode are substantially perpendicular to the third portion of the pixel electrode; and forming a thin film transistor at a crossing of the gate and data lines, the thin film transistor having of the gate electrode, the active layer, the ohmic contact layer, the source electrode and the drain electrode, wherein the second common electrode is formed to have a width larger than the first common electrode.

2. The method according to claim 1, wherein the third portion of the pixel electrode is disposed right above the common line.

3. The method according to claim 1, wherein an end of the first portion of the pixel electrode is connected to the drain electrode of the thin film transistor.

4. The method according to claim 1, wherein the source electrode extends from the data line, the gate electrode extends from the gate line, the drain electrode extends from the first portion of the pixel electrode, the active layer is disposed right above the gate electrode, and the ohmic contact layer interposed between the active layer and the source and drain electrodes.

5. The method according to claim 1, wherein the first and second metal layers are formed of one of aluminum (Al), aluminum alloy (Al alloy), chromium (Cr), molybdenum (Mo), and tungsten (W).

6. The method according to claim 1, wherein the common line and the first and second common electrodes are formed as one united body.

7. The method according to claim 1, wherein the pixel electrode and the drain electrode are formed as one united body.

8. The method according to claim 1, wherein the third portion of the pixel electrode and a portion of the common line with the gate insulation layer interposed therebetween form a first storage capacitor.

9. The method according to claim 1, wherein the second portion of the pixel electrode and the second common electrode with the gate insulation layer interposed therebetween form a second storage capacitor.

10. The method according to claim 1, wherein the gate and common lines are spaced apart from each other.

11. The method according to claim 1, wherein the first and second common electrodes substantially perpendicularly extend from the common line.

12. The method according to claim 1, wherein a width of the second portion of the pixel electrode is smaller than a width of the second common electrode.

13. A method of fabricating an array substrate for use in an IPS-LCD device, comprising:
forming a gate line, a gate electrode, a common line and first and second common electrodes on a substrate using a first metal layer, wherein the sate and common lines are disposed in a first direction;
forming a gate insulation layer on an entire surface of the substrate to cover the first metal layer;
forming an active layer on the gate insulation layer and an ohmic contact layer on the active layer using an amorphous silicon and impurity-doped amorphous silicon;
forming a data line, a source electrode, a drain electrode and a pixel electrode using a second metal layer, wherein the data line is disposed on the gate insulation layer in a second direction substantially perpendicularly crossing both the gate line and the common line to define a pixel area, wherein the source and drain electrodes are disposed on the ohmic contact layer and spaced apart from each other, and wherein the pixel electrode is disposed on the gate insulation layer and includes a first portion that is disposed between the first and second common electrodes, a second portion that is disposed overlapping the second common electrode, and a third portion that is disposed above the common line, wherein the first and second portions of the pixel electrode are substantially perpendicular to the third portion of the pixel electrode; and
forming a thin film transistor at a crossing of the gate and data lines, the thin film transistor having of the gate electrode, the active layer, the ohmic contact layer, the source electrode and the drain electrode,
wherein the second common electrode is formed to have a width larger than the first common electrode, and
wherein a width of the second common electrode overlapped by the second portion of the pixel electrode is larger than that of the second portion of the pixel electrode by about 6 micrometers.

14. A method of fabricating an array substrate for use in an IPS-LCD device, comprising:
forming a gate line, a gate electrode, a common line and first and second common electrodes on a substrate using a first metal layer, wherein the gate and common lines are disposed in a first direction;
forming a gate insulation layer on an entire surface of the substrate to cover the first metal layer;
forming an active layer on the gate insulation layer and an ohmic contact layer on the active layer using an amorphous silicon and impurity-doped amorphous silicon;
forming a data line, a source electrode, a drain electrode and a pixel electrode using a second metal layer, wherein the data line is disposed on the gate insulation layer in a second direction substantially perpendicularly crossing both the gate line and the common line to define a pixel area, wherein the source and drain electrodes are disposed on the ohmic contact layer and spaced apart from each other, and wherein the pixel electrode is disposed on the gate insulation layer and includes a first portion that is disposed between the first and second common electrodes, a second portion that is disposed overlapping the second common electrode, and a third portion that is disposed above the common line, wherein the first and second portions of the pixel electrode are substantially perpendicular to the third portion of the pixel electrode; and
forming a thin film transistor at a crossing of the gate and data lines, the thin film transistor having of the gate electrode, the active layer, the ohmic contact layer, the source electrode and the drain electrode,
wherein the second common electrode is formed to have a width larger than the first common electrode, and
wherein a distance between the first and second portions of the pixel electrode is larger than a distance between the first portion of the pixel electrode and the second common electrode by about 3 micrometers.

15. A method of fabricating an array substrate for use in an LPS-LCD device, comprising:
forming a gate line, a gate electrode, a common line and first and second common electrodes on a substrate using a first metal layer, wherein the gate and common lines are disposed in a first direction;
forming a gate insulation layer on an entire surface of the substrate to cover the first metal layer;
forming an active layer on the gate insulation layer and an ohmic contact layer on the active layer using an amorphous silicon and impurity-doped amorphous silicon;
forming a data line, a source electrode, a drain electrode and a pixel electrode using a second metal layer, wherein the data line is disposed on the gate insulation layer in a second direction substantially perpendicularly crossing both the gate line and the common line to define a pixel area, wherein the source and drain electrodes are disposed on the ohmic contact layer and spaced apart from each other, and wherein the pixel electrode is disposed on the gate insulation layer and includes a first portion that is disposed between the first and second common electrodes, a second portion that is disposed overlapping the second common electrode, and a third portion that is disposed above the common line, wherein the first and second portions of the pixel electrode are substantially perpendicular to the third portion of the pixel electrode; and
forming a thin film transistor at a crossing of the gate and data lines, the thin film transistor having of the gate electrode, the active layer, the ohmic contact layer, the source electrode and the drain electrode,
wherein the second common electrode is formed to have a width larger than the first common electrode, and
wherein a difference in the width of the first common electrode and the second common electrode is 6 micrometers.

* * * * *